United States Patent
Park et al.

(10) Patent No.: US 8,752,887 B2
(45) Date of Patent: Jun. 17, 2014

(54) HYBRID COMBINATION STRUCTURE OF ROOF FRAME

(71) Applicants: Hyundai Motor Company, Seoul (KR); Webasto Donghee Holdings Co., Ltd., Ulsan (KR)

(72) Inventors: Jeong Hoon Park, Suwon-si (KR); Jong Rak Kim, Ulsan (KR)

(73) Assignees: Hyundai Motor Company, Seoul (KR); Webasto Donghee Holdings Co., Ltd., Ulsan (KR)

( * ) Notice: Subject to any disclaimer, the term of this patent is extended or adjusted under 35 U.S.C. 154(b) by 17 days.

(21) Appl. No.: 13/692,784

(22) Filed: Dec. 3, 2012

(65) Prior Publication Data

US 2014/0062144 A1   Mar. 6, 2014

(30) Foreign Application Priority Data

Aug. 29, 2012   (KR) .......... 10-2012-0094992

(51) Int. Cl.
   *B62D 25/06*   (2006.01)
(52) U.S. Cl.
   CPC .......... *B62D 25/06* (2013.01); *Y10S 296/90101* (2013.01)
   USPC .................... 296/210; 296/901.01
(58) Field of Classification Search
   CPC ..................................... B62D 25/06
   USPC .................... 296/210, 901, 901.01
   See application file for complete search history.

(56) References Cited

U.S. PATENT DOCUMENTS

| | | | | |
|---|---|---|---|---|
| 4,138,155 A | * | 2/1979 | Chrysler | 296/218 |
| 4,729,596 A | * | 3/1988 | Fujihara et al. | 296/218 |
| 5,009,463 A | | 4/1991 | Saitoh et al. | |
| 5,052,743 A | * | 10/1991 | Inada et al. | 296/210 |
| 5,139,845 A | * | 8/1992 | Beckerman et al. | 428/117 |
| 6,347,829 B1 | * | 2/2002 | Hanyu | 296/210 |
| 7,677,652 B2 | * | 3/2010 | Mollick et al. | 296/210 |
| 8,221,673 B2 | * | 7/2012 | Saur et al. | 264/573 |
| 2007/0057537 A1 | * | 3/2007 | Barutzky et al. | 296/210 |
| 2011/0031782 A1 | * | 2/2011 | Disse et al. | 296/216.09 |

FOREIGN PATENT DOCUMENTS

| | | | | |
|---|---|---|---|---|
| EP | 76934 A1 | * | 4/1983 | ............ B62D 29/04 |
| JP | 64-90881 A | | 4/1989 | |
| KR | 100517701 B1 | | 9/2005 | |
| KR | 20070122293 A | | 12/2007 | |
| KR | 100916396 B1 | | 9/2009 | |

* cited by examiner

*Primary Examiner* — Lori Lyjak
(74) *Attorney, Agent, or Firm* — Morgan, Lewis & Bockius LLP

(57) ABSTRACT

A hybrid combination structure of a roof frame is provided. In particular, the hybrid combination structure of a roof frame is configured to include a roof frame made of a plastic material, a front reinforce panel made of a steel material and mounted at a front of the roof frame, a center reinforce panel made of a steel material and mounted at a middle of the roof frame, and a rear reinforce panel made of a steel material and mounted at a rear of the roof frame to provide the integral roof frame in which steel and plastic are combined with each other, thereby improving sag and torsion problems to improve support rigidity and reducing weight and costs to improve a value of the product.

5 Claims, 4 Drawing Sheets

(a)

(b)

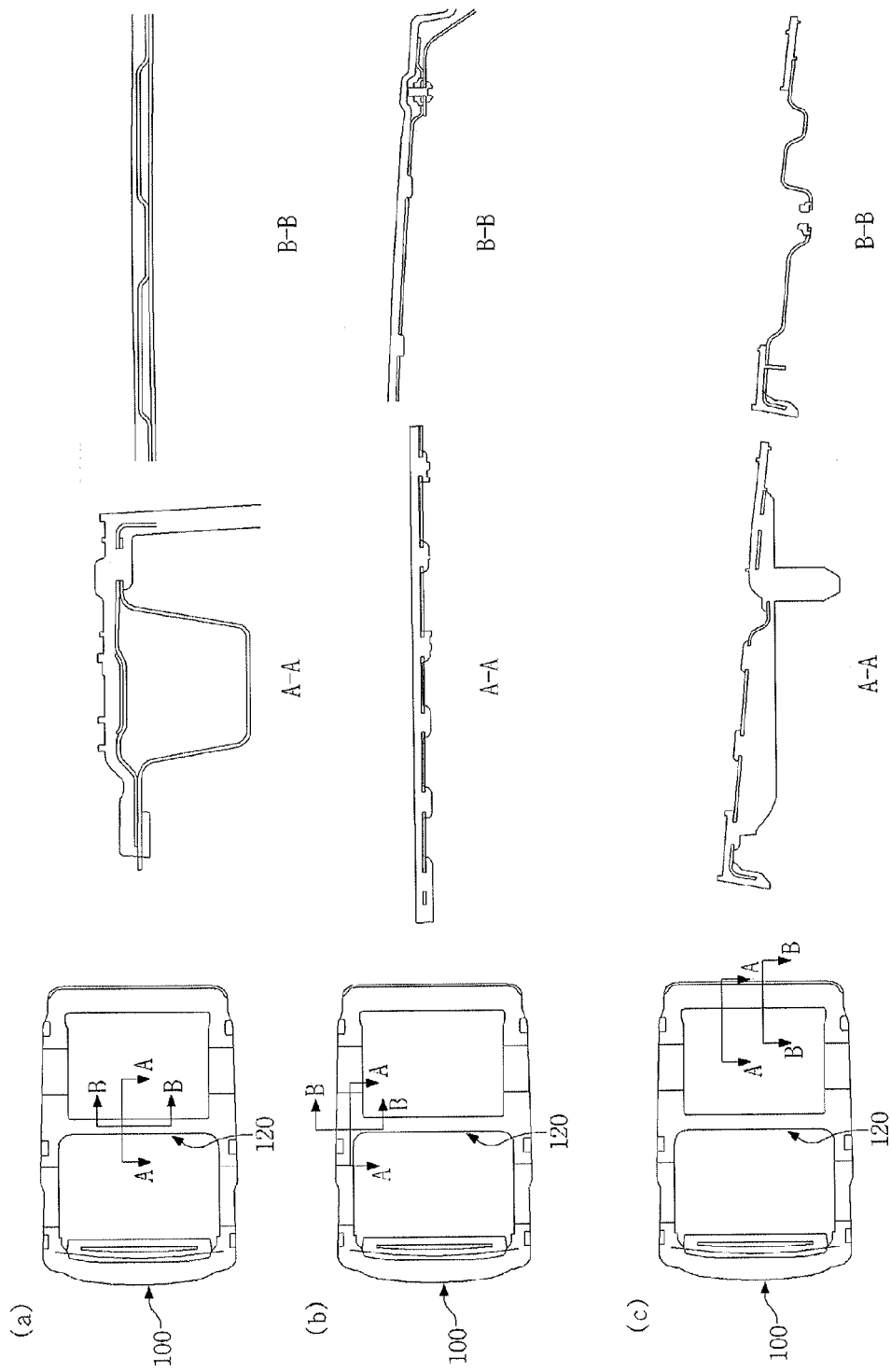

HYBRID COMBINATION STRUCTURE OF ROOF FRAME

CROSS-REFERENCE TO RELATED APPLICATION

The present application claims priority of Korean Patent Application Number 10-2012-0094992 filed Aug. 29, 2012, the entire contents of which application is incorporated herein for all purposes by this reference.

BACKGROUND OF INVENTION

1. Field of Invention

The present invention relates to a hybrid combination structure of a roof frame, and in particular, to a hybrid combination structure of a roof frame for improving support rigidity and an assembling structure of a roof frame.

2. Description of Related Art

Generally, a car is configured by connecting various kinds of panels based on a body panel, wherein the panel obtain high strength by bending a predetermined portion or obtain sufficient support force by overlappingly combining separate panels.

Further, a weight of the panels is increased due to the overlapping combination of panels. In order to prevent the increase in weight, the weight of the panel is increased by forming through holes on a predetermined portion of the panel at a predetermined interval.

Meanwhile, when reviewing the combination configuration between the panels forming a side of a car, an outer side of the panel is mounted with an outer panel so as to be harmonized with an exterior decoration of a car based on a side panel configured to have a door shape and an inner side thereof is overlappingly welded with inner panels for reinforcing, wherein the inner panel is separately divided so as to be combined with a filler inner panel.

Meanwhile, the outer side of the inner panel that are combined with each other in the same shape as the side panel is vertically combined with an end of a roof center frame and a top portion thereof is mounted with a loop panel so as to be integrally welded with the outer panel to form a top part of a car.

According to the related art, a combination part of the inner panel and the loop center frame has a structure that is combined by mounting a predetermined portion of the roof center frame on the side of the inner panel and therefore, has a very weak support force. Therefore, the combining part cannot support the roof panel, thereby degrading support rigidity.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, the present invention has been made to solve the above-mentioned problems occurring in the prior art while advantages achieved by the prior art are maintained intact.

The present invention relates to a hybrid combination structure of a roof frame so as to solve the above problem. In particular, various aspects of the present invention improve support rigidity and an assembling structure of a roof frame.

In various aspects of the present invention, there is provided a hybrid combination structure of a roof frame, including: a roof frame made of a plastic material; a front reinforcing panel made of a steel material and mounted at a front of the roof frame; a center reinforcing panel made of a steel material and mounted at a middle of the roof frame; and a rear reinforcing panel made of a steel material and mounted at a rear of the roof frame.

The center reinforcing panel may include a center lower reinforcing panel and a center upper reinforcing panel.

The center upper reinforcing panel may be mounted with a center reinforcing upper bracket in a width direction of the roof frame.

Both ends of the center reinforcing upper bracket may be provided with a plurality of insertion protrusions in a length direction and the center upper reinforcing panel may be provided with a plurality of insertion grooves to be coupled with the insertion protrusions.

The middle of the roof frame may be provided with a center bracket to combine the roof frame with the center reinforcing panel.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIGS. 5A to 5C are cross-sectional views of a center reinforcing panel, a side portion of the roof frame, and a rear reinforcing panel of an exemplary hybrid combination structure of a roof frame according to the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

As illustrated in FIGS. 1 to 4, a hybrid combination structure of a roof frame according to an embodiment of the present invention has a basic structure in which a front reinforcing panel 110, a center reinforcing panel 120, and a reinforcing reinforce panel 130 are mounted on a roof frame 100.

Figure 1:
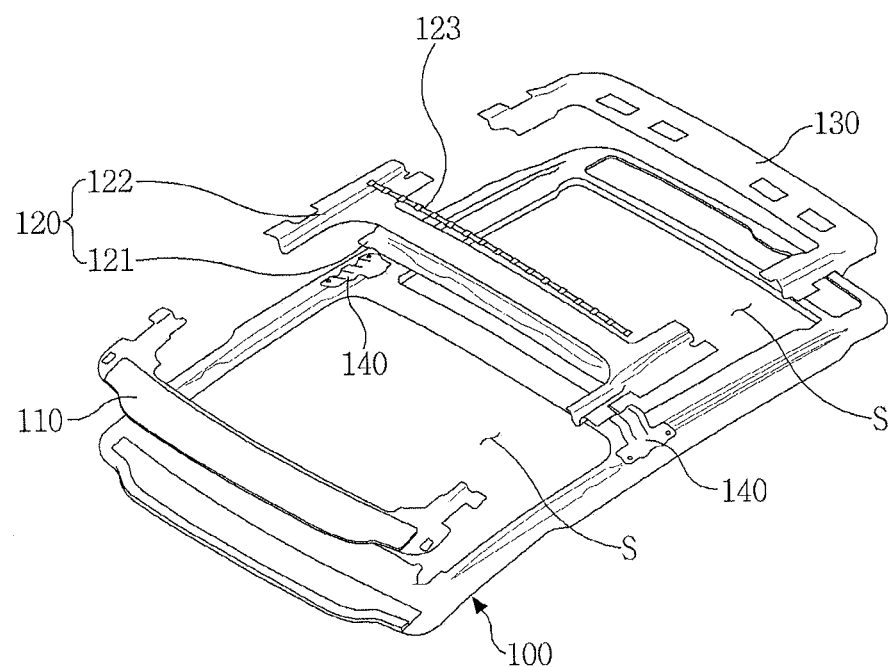
FIG. 1 is an exploded perspective view illustrating an exemplary hybrid combination structure of a roof frame according to the present invention.

As illustrated in FIG. 1, the roof frame 100 forms a roof panel of a car and is extendedly formed in a front and back direction of a car.

Meanwhile, the roof frame 100 according to the embodiment of the present invention has a space part S formed at a front side and a rear side based on a center line of the roof frame 100 so as to mount a panorama sun roof thereon.

In this case, the roof frame 100 is made of a plastic material.

As illustrated in FIGS. 1 and 5, the front reinforcing panel 110 is made of a steel material and is mounted at a front of the roof frame 100.

The rear reinforcing panel 130 is made of a steel material and is mounted at a rear of the roof frame 100.

The center reinforcing panel 120 is made of a steel material and is mounted at a middle of the roof frame 100.

Here, as described above, the present invention relates to the roof frame 100 on which the panorama sunroof is mounted, wherein the roof frame 100 has a space part S formed at a front and a rear thereof to degrade rigidity. Therefore, in order to solve the above problem, the roof frame 100 is mounted with the front reinforcing panel 110, the rear reinforcing panel 130, and the center reinforcing panel 120.

In this case, the middle of the roof frame 100 has remarkably degraded rigidity due to the space part S and thus, it is essential to mount the center reinforcing panel 120.

In the embodiment of the present invention, in order to improve rigidity of the roof frame 100 and the center reinforcing panel 120, the center reinforcing panel 120 made of a steel material is mounted on the roof frame 100 of a plastic material to provide an integral frame without a separate assembling process, thereby minimizing the occurrence of torsion and deformation.

In addition, it is easy to secure rigidity by applying a double structure in which the center reinforcing panel 120 is formed of a center lower reinforcing panel 121 supporting a bottom portion and the center upper reinforcing panel 122 supporting a top portion.

Figure 2:
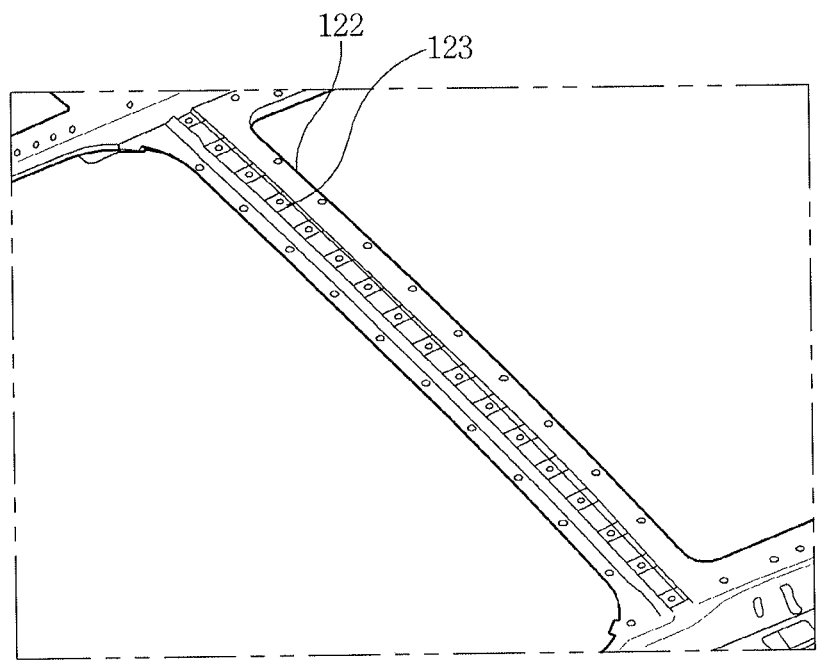
FIG. 2 is a diagram illustrating an exemplary combination state of a center reinforcing panel and a center reinforcing upper bracket having an hybrid combination structure of a roof frame according to the present invention.

In this case, as illustrated in FIGS. 1 and 2, it is possible to improve the rigidity reinforcement by mounting the center reinforcing upper bracket 123 on the center upper reinforcing panel 122 in a width direction (a length direction of the center upper reinforcing panel 122) of the roof frame 100.

Here, both ends of the center reinforcing upper bracket 123 is longitudinally formed with a plurality of insertion protrusions 124 and the center upper reinforcing panel 122 are formed with a plurality of insertion grooves so that the insertion protrusions 124 are inserted into the insertion grooves at the time of combining the center upper reinforcing panel 122 with the center reinforcing upper bracket 123, thereby improving the adhesion.

Figure 3:
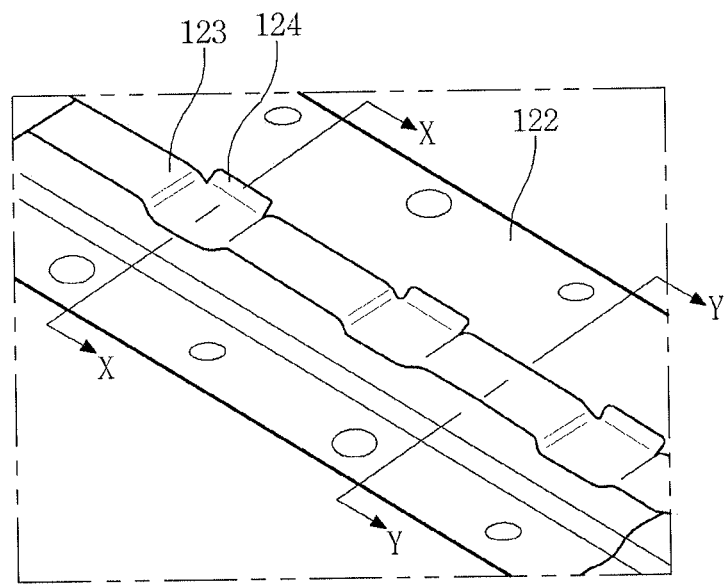
FIG. 3 is a diagram illustrating main parts of FIG. 2.
Figure 4:
FIG. 4A is a cross-sectional view illustrating the line X-X of FIG. 3.
FIG. 4B is a cross-sectional view illustrating the line Y-Y of FIG. 3.
Figure 4:
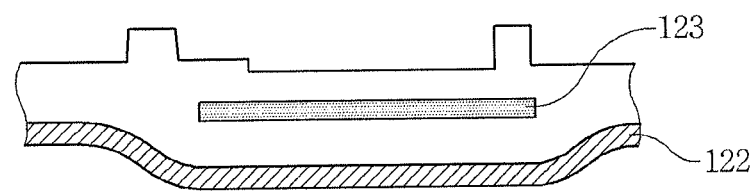

Meanwhile, as illustrated in FIG. 4A, the center reinforce panel 120 is combined with the center reinforcing upper bracket 123 at a portion in which the insertion protrusions 124 are inserted into the insertion grooves when the center upper reinforcing panel 122 is combined with the center reinforcing upper bracket 123 as illustrated in FIG. 3 and as illustrated in FIG. 4B, the center reinforcing panel 120 and the center reinforcing upper bracket 123 are spaced apart from each other at a portion in which the insertion protrusions 124 are not inserted into the insertion grooves.

Further, the middle of the roof frame 100 is provided with a center bracket 140, thereby improving the adhesion between the roof frame 100 and the center reinforcing panel 120.

As set forth above, it is possible to prevent sagging and torsion to improve support rigidity and reduce the weight and costs in order to increase the value of the product, by implementing the integral roof frame in which steel and plastic are combined with each other.

For convenience in explanation and accurate definition in the appended claims, the terms upper or lower, front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hybrid combination structure of a roof frame, comprising:
    a roof frame made of a plastic material;
    a front reinforcing panel made of a steel material and mounted at a front of the roof frame;
    a center reinforcing panel made of a steel material and mounted at a middle of the roof frame; and
    a rear reinforcing panel made of a steel material and mounted at a rear of the roof frame.

2. The hybrid combination structure of a roof frame according to claim 1, wherein the center reinforcing panel includes a center lower reinforcing panel and a center upper reinforcing panel.

3. The hybrid combination structure of a roof frame according to claim 2, wherein the center upper reinforcing panel is mounted with a center reinforcing upper bracket in a width direction of the roof frame.

4. The hybrid combination structure of a roof frame according to claim 3, wherein both ends of the center reinforcing upper bracket are provided with a plurality of insertion protrusions in a length direction and the center upper reinforcing panel is provided with a plurality of insertion grooves to be coupled with the insertion protrusions.

5. The hybrid combination structure of a roof frame according to claim 2, wherein the middle of the roof frame is provided with a center bracket to combine the roof frame with the center reinforcing panel.

* * * * *